(12) United States Patent
Nellayi et al.

(10) Patent No.: US 10,565,101 B2
(45) Date of Patent: Feb. 18, 2020

(54) STORING DATA IN A STORAGE DEVICE

(71) Applicant: HEWLETT PACKARD ENTERPRISE DEVELOPMENT LP, Houston, TX (US)

(72) Inventors: Narayanan Ananthakrishnan Nellayi, Bangalore (IN); Shyamalendu Sarkar, Bangalore (IN); Subhakar Vipparti, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/767,444

(22) PCT Filed: Mar. 4, 2016

(86) PCT No.: PCT/US2016/021006
§ 371 (c)(1),
(2) Date: Apr. 11, 2018

(87) PCT Pub. No.: WO2017/131798
PCT Pub. Date: Aug. 3, 2017

(65) Prior Publication Data
US 2018/0293161 A1    Oct. 11, 2018

(30) Foreign Application Priority Data
Jan. 29, 2016    (IN) .............................. 201641003325

(51) Int. Cl.
*G06F 12/02*  (2006.01)
*G06F 16/182* (2019.01)
*G06F 3/06*   (2006.01)

(52) U.S. Cl.
CPC ............ *G06F 12/023* (2013.01); *G06F 3/064* (2013.01); *G06F 3/0607* (2013.01); *G06F 3/067* (2013.01);
(Continued)

(58) Field of Classification Search
CPC ........ G06F 3/067; G06F 3/064; G06F 3/0685; G06F 3/0607; G06F 16/182; G06F 12/023; G06F 16/17; G06F 16/00; G06F 3/0661
(Continued)

(56) References Cited

U.S. PATENT DOCUMENTS 6,125,435 A    9/2000 Estakhri et al.
7,945,726 B2   5/2011 Faibish et al.
(Continued)

FOREIGN PATENT DOCUMENTS

WO    WO-2006065536 A1    6/2006

OTHER PUBLICATIONS

Hewlett Packard Enterprise Development LP, "HPE 3PAR File Persona Software," copyright 2016, http://www8.hp.com/us/en/products/storage-software/product-detail.html?oid=7415887.
(Continued)

*Primary Examiner* — Hua J Song
(74) *Attorney, Agent, or Firm* — Hewlett Packard Enterprise Patent Department

(57) ABSTRACT

For storing data in a storage device, a storage allocation request may be received. The storage allocation request may include a logical offset of data to be stored. Further, a chunk size of the storage device and a device offset for a free region on the storage device may be received. An offset value may be computed based on the chunk size, file system block size, the device offset, and the logical offset. A device start address, for storing the data in response to the storage allocation request, can be determined by offsetting the device offset with the offset value.

12 Claims, 7 Drawing Sheets

(52) U.S. Cl.
CPC .......... *G06F 3/0661* (2013.01); *G06F 3/0685* (2013.01); *G06F 16/182* (2019.01)
(58) Field of Classification Search
USPC ........................................................ 711/114
See application file for complete search history.

(56) References Cited

U.S. PATENT DOCUMENTS

| | | | |
|---|---|---|---|
| 8,793,465 | B1 | 7/2014 | Forgette et al. |
| 8,903,877 | B1 | 12/2014 | Vempati et al. |
| 9,483,187 | B2 | 11/2016 | Karaje et al. |
| 2009/0077342 | A1 | 3/2009 | Chen et al. |
| 2009/0210614 | A1 | 8/2009 | Gorobets |
| 2010/0185830 | A1 | 7/2010 | Asnaashari et al. |
| 2011/0047347 | A1* | 2/2011 | Li .................... G06F 12/0246 711/209 |
| 2011/0078342 | A1 | 3/2011 | Siddabathuni et al. |
| 2014/0181239 | A1 | 6/2014 | Gaonkar et al. |

OTHER PUBLICATIONS

International Search Report & Written Opinion received in PCT Application No. PCT/US2016/021006, dated Oct. 26, 2016, 12 pages.

Josephson, W.K. et al., "DFS: A File System for Virtualized Flash Storage," Sep. 2010, vol. 6, No. 3, 15 pages, http://static.usenix.org/event/fast10/tech/full_papers/josephson.pdf.

Permabit, "Permabit Data Reduction Technologies," 2015, 3 pages, http://permabit.com/technologies/.

Springpath, Inc., "Springpath Data Platform," Feb. 2015, 17 pages, http://springpathinc.com/resources/pdf0916/Springpath_Data_Platform_WP_LR_1001.pdf.

Suzaki, K., "Analysis of Disk Access Patterns on File Systems for Content Addressable Storage," 2011, 14 pages, https://www.kernel.org/doc/mirror/ols2011.pdf#page=23.

Yasa, G. A. N. et al., "Space Savings and Design Considerations in Variable Length Deduplication," Dec. 2012, 8 pages, https://atg.netapp.com/wp-content/uploads/2012/12/Variable_length-dedup_Giridhar.pdf.

Marc Staimer, "A comparison of data compression and data deduplication technologies for SMBs," Mar. 2009, <https://searchdatabackup.techtarget.com/tip/A-comparison-of-data-compression-and-data-deduplication-technologies-for-SMBs>.

Permabit Technology Corporation, "Permabit Albireo Data Optimization Software: Virtual Data Optimizer (VDO) for Linux," Aug. 2012, <https://datastorageasean.com/sites/default/files/Permabit-Albireo-VDO-wp.pdf>.

Storer et al., "Secure data deduplication," In Proceedings of the 4th ACM international workshop on Storage security and survivability, Oct. 2008, pp. 1-10, <https://www.crss.ucsc.edu/Papers/storer-storagess08.pdf>.

* cited by examiner

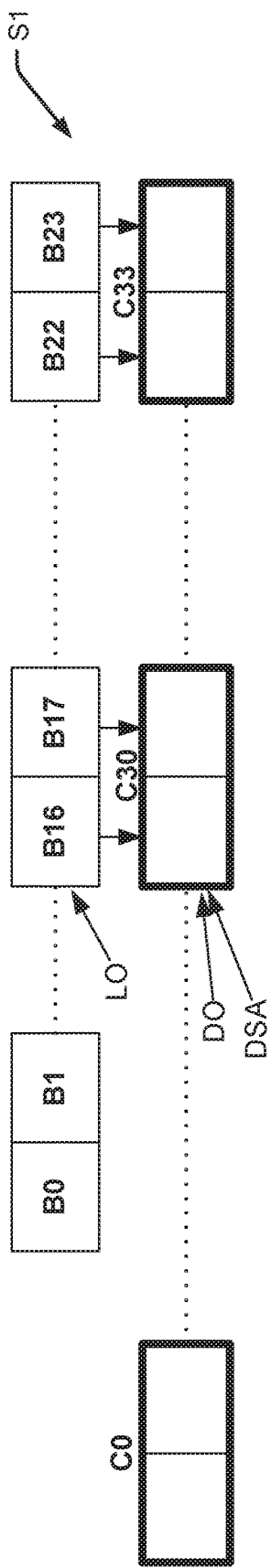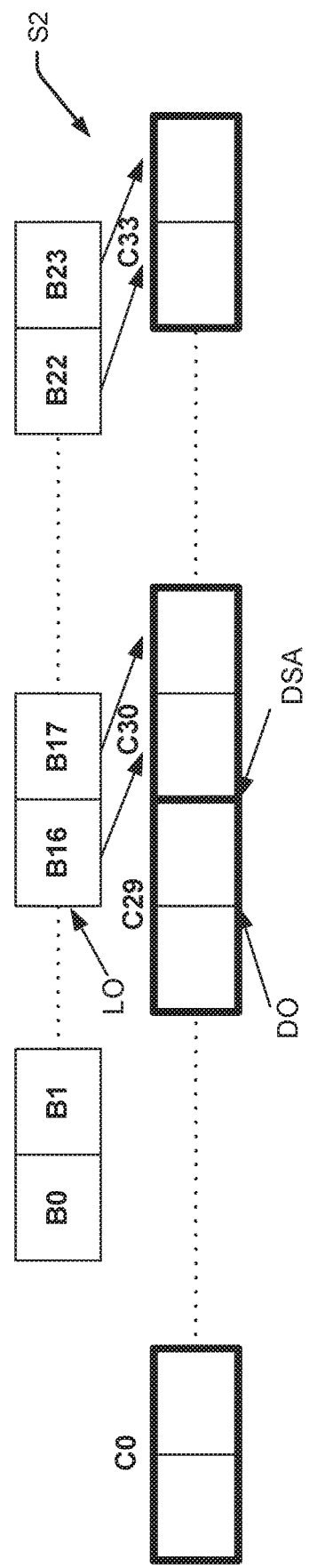

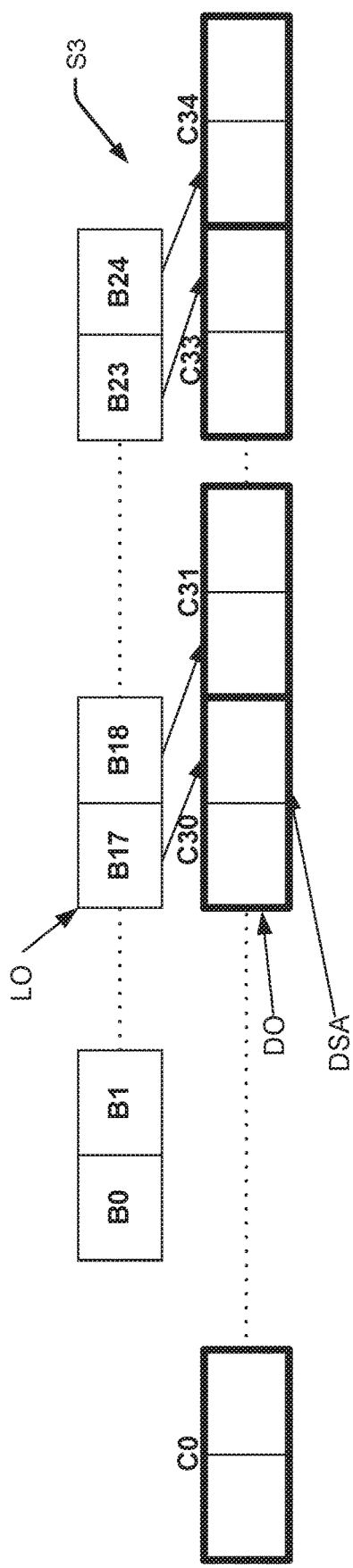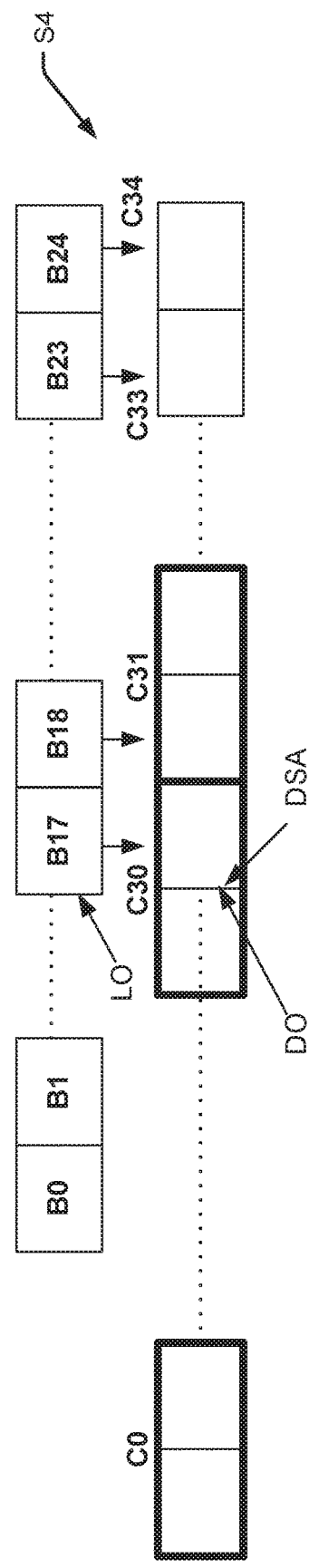

STORING DATA IN A STORAGE DEVICE

BACKGROUND

In computing devices, a file system is used to manage and organize how data is stored in and retrieved from a storage device. The file system keeps track of the regions where data is stored in the storage device and the free regions in the storage device. A file system can also manage the storage and retrieval of data from different types of storage devices, for example, in converged stack storage arrays.

BRIEF DESCRIPTION OF DRAWINGS

The detailed description is provided with reference to the accompanying figures where:

FIGS. 2(a)-2(d) illustrate example scenarios for storing data, according to example techniques of the present disclosure.

DETAILED DESCRIPTION

Figure 1A:
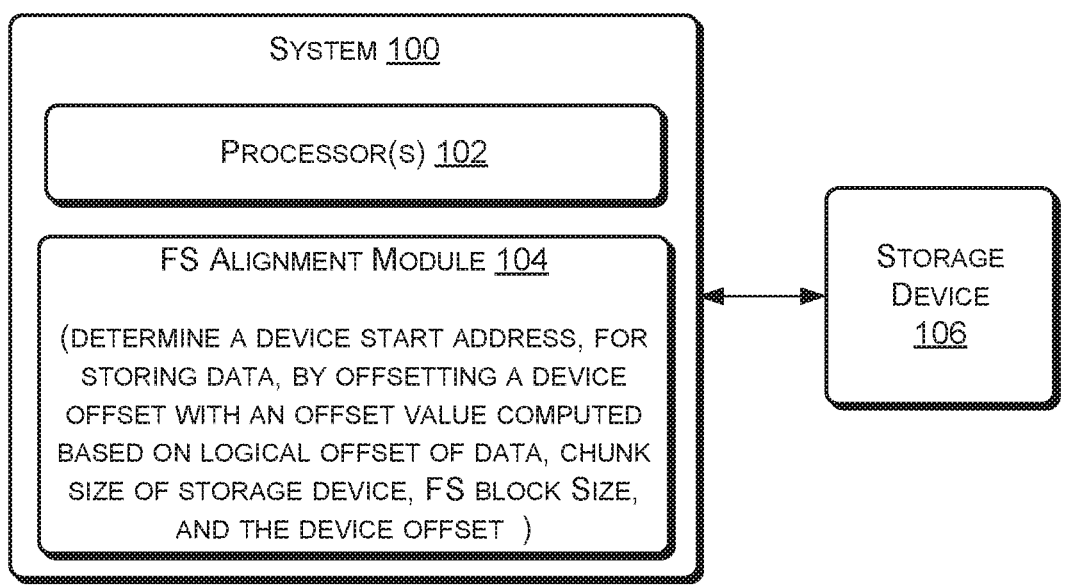
FIG. 1a illustrates a system implementation for storing data, according to example techniques of the present disclosure.

A file system is used in computing devices to store data in and retrieve data from storage devices. For this, the storage devices expose the usable storage space to the file system. On receiving a request from an application for allocation of storage space for storing data, the file system utilizes the storage space exposed by the storage devices for the allocation and storage of data.

A file system generally addresses the data in blocks and stores the data based on a logical offset specified by the application providing the data. The block size used by the file system may be pre-defined. For example, one file system may use a block size of 4 KB while another file system may use a block size of 8 KB. The logical offset specified by the application may or may not be a multiple of the block size. Hence, the logical offset, i.e., starting logical address of data to be stored, may occur within a block and may not be aligned to the block start address.

A storage device, on the other hand, manages the storage space as chunks. The chunks may be of a fixed size for a given storage device, but may vary between storage devices. For example, one storage device may use a chunk size of 512 bytes while another storage device may use a chunk size of 16 KB. The storage device may have fragmented free regions and used regions. Each free region may be identified by a device offset at which it starts. The device offset may or may not be a multiple of the chunk size. Hence, the device offset, i.e., starting address of a free region, may occur within a chunk and may not be aligned to the chunk start address.

Further, as the file system block size and the storage device chunk size may be different from each other, the logical offset may be differently aligned with respect to the file system block size and the storage device chunk size than the device offset. In some scenarios, the file system may use different types of storage devices with different chunk sizes. For example, for online transactions, which have to be updated in real-time, fast solid state drives may be used, while periodic incremental backups may be catered to using slower hard disks. Since the different storage devices may have different chunk sizes, the alignment of the logical offsets and device offsets may also vary across the different storage devices.

The differences in alignment can affect efficiency of capacity optimization techniques, such as thin provisioning, de-duplication, compression, and thin reclamation, utilized by the storage devices. Thin provisioning allows storage provisioning on demand by the file system while thin reclamation enables the file system to inform the storage device on demand that the storage can be deallocated. Deduplication and compression prevent storing duplicates of original data by, for example, replacing the duplicate data with a pointer to the original data. Since these capacity optimization techniques are applied by storage devices, they are performed at a chunk level. Hence, in case duplicate data is not aligned similarly at a chunk level, the efficiency of these techniques reduces. Similarly, if free regions are not aligned at the chunk level, the efficiency of these techniques reduces. Since file systems organize data in block sizes, which can be different from chunk sizes, and due to the differences in alignment of the logical offsets and device offsets, the efficiency of the capacity optimization techniques gets reduced.

The present disclosure relates to systems and methods for storing data in storage devices. The described methods and systems help to improve the efficiency of capacity optimization techniques used in storage device. The described systems and methods may be implemented in various computing devices including stand-alone computing devices, networked computing devices, and computing devices that operate in or provide virtual environments.

In one example, storing data in storage devices may be performed by an adaptive file system implemented by the systems and methods. For this, the adaptive file system can allocate storage using an alignment reference value, which is determined based on the file system block size and the device chunk size. The alignment reference value is a reference value to which the alignment of the device offset and the logical offset are compared. The adaptive file system allocates storage such that either both the logical offset and the device offset are aligned to the alignment reference value or both the logical offset and the device offset are similarly misaligned to the alignment reference value, for example, misaligned by the same number of bytes.

In one example, the alignment reference value is determined based on the least common multiple of the file system block size and device chunk size. To allocate the storage, the adaptive file system determines a device start address for the data to be stored by offsetting the device offset by an offset value that is computed based on the logical offset, device offset, and the alignment reference value. Thus, the adaptive file system takes into account the block size, chunk size, logical offset, and device offset to determine the device start address. As will be illustrated later, this helps to align duplicate data and free regions at the chunk level in the storage devices.

Accordingly, the adaptive file system ensures that storage is allocated such that the capacity optimization techniques can be efficiently utilized. Further, the adaptive file system can perform the alignment for different storage devices having different chunk sizes without having to implement a variable chunking model or variable sized file system block support. As a result, the processing overheads involved in implementing the adaptive file system are minimal. Moreover, since the alignment is adapted for each data storage request rather than merely aligning the beginning of a file to the beginning of a chunk, the present disclosure can more effectively manage storage space as a file grows by allowing the capacity optimization techniques to work efficiently at a more granular data level rather than merely working at a file level.

The above mentioned systems and methods are further described with reference to figures. It should be noted that the description and figures merely illustrate the principles of the present disclosure along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1a illustrates an example system implementation for storing data, according to example techniques of the present disclosure. As illustrated, a system 100 includes processor(s) 102 and a file system alignment module 104. The file system alignment module 104 is also referred to as FS alignment module 104 hereinafter. The system 100 may be implemented as any of a variety of computing systems, such as a desktop computer, a laptop computer, a server, a tablet, and the like.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in a memory. The functions of the processor 102 may be provided through the use of dedicated hardware as well as hardware capable of executing machine readable instructions.

The FS alignment module 104 may be coupled to and/or be executable by the processor(s) 102, and may include, amongst other things, routines, programs, objects, components, data structures, and the like, which perform particular tasks or implement particular abstract data types.

In operation, the FS alignment module 104 can receive a request for storage allocation for storing data. The request for storage allocation may be generated by an application and may include a logical offset at which the data is to be stored and a size of the data to be stored. As may be understood, the logical offset is the position in a file at which the data is to be stored. The FS alignment module 104 may determine that the data is to be stored in a storage device 106 and may receive a chunk size of the storage device 106 and a device offset for a free region on the storage device 106. For ease of discussion, device chunk size is also referred to as chunk size and file system block size is also referred to as block size hereinafter. In one example, the FS alignment module 104 maintains a record of the chunk sizes and free regions of storage devices available to it, for example, in a mapping table and may therefore read the information from the mapping table. In another example, the FS alignment module 104 may query the storage device 106 to determine the chunk size and the device offset of the free region. In another example, the FS alignment module 104 may receive the chunk size and the device offset from a file system with which it operates. Further, the FS alignment module 104 may also be aware of, or receive from the file system, the block size used by the file system for storage of data.

The FS alignment module 104 then computes an offset value based on the device chunk size, the file system block size, the device offset, and the logical offset to determine the device start address for storing the data in response to the storage allocation request. In one example, the device start address is set to the device offset shifted by the offset value.

In one implementation, to compute the offset value, the FS alignment module 104 can determine an alignment reference value based on the chunk size and a file system block size. For example, the alignment reference value may be the least common multiple of the chunk size and the file system block size. In another example, the alignment reference value may be a multiple of the least common multiple of the chunk size and the file system block size. In yet another example, the alignment reference value may be some other function of the chunk size and the file system block size.

The FS alignment module 104 may then compute the offset value such that the device start address is aligned to the alignment reference value when the logical offset is aligned to the alignment reference value, and the device start address is misaligned to the alignment reference value by a similar size when the logical offset is misaligned to the alignment reference value. In other words, the offset value is the number of bytes by which the device offset is to be shifted so that, after shifting, the device offset and the logical offset are both aligned or are both similarly misaligned. It will be understood that similarly misaligned refers to the device offset and the logical offset being misaligned to the alignment reference value by the same number of bytes. Hence, the offset value may be zero in case it is determined that both the device offset and logical offset are already aligned or already similarly misaligned to the alignment reference value. The device start address thus computed can be used for storing the data in the storage device 106.

Accordingly, as a file grows, the data is stored in a manner such that data at the same logical offset in a file is aligned similarly in the chunks. Therefore capacity optimization, such as deduplication, compression, and thin reclamation, can be performed more efficiently at the data level.

Figure 1B:
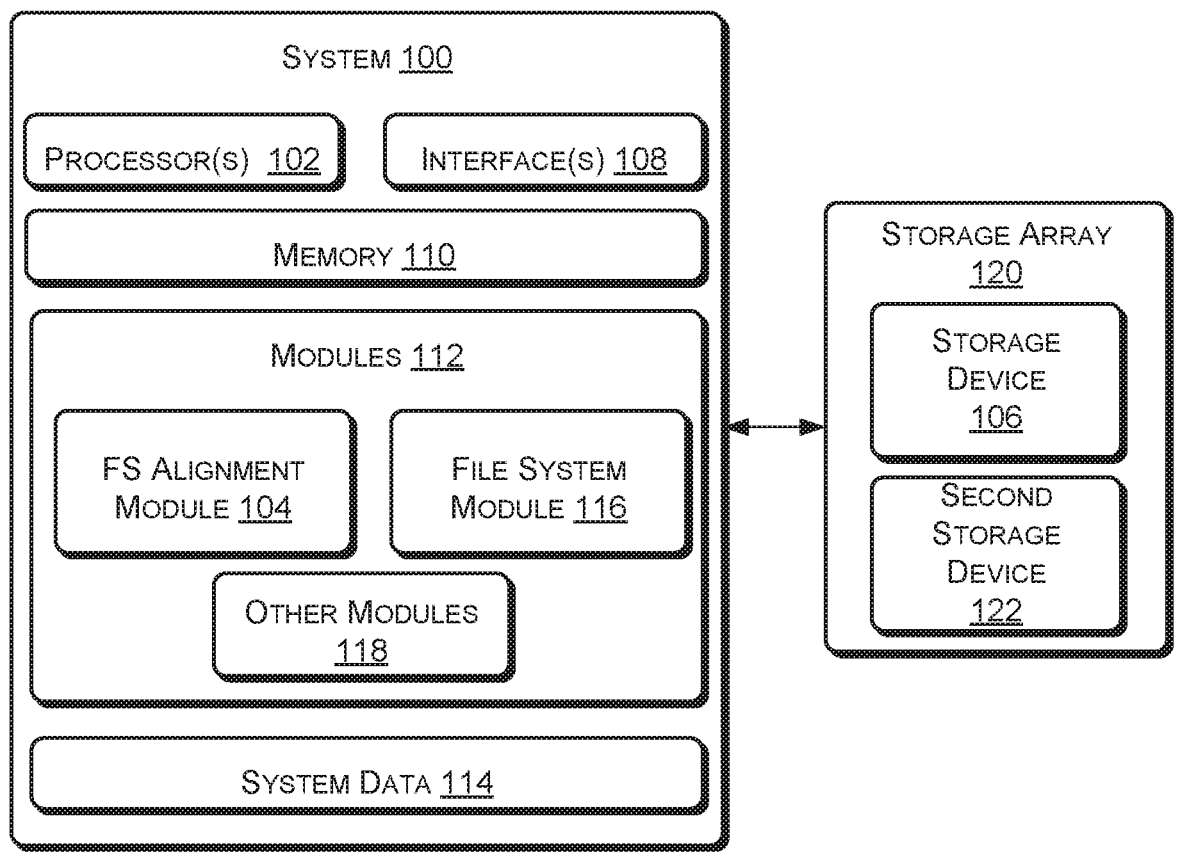
FIG. 1b illustrates a system implementation for storing data, according to example techniques of the present disclosure.

FIG. 1b illustrates another example system implementation for storing data, according to example techniques of the present disclosure. As illustrated, in addition to the processor(s) 102, the system 100 may include interface(s) 108, memory 110, modules 112, and system data 114.

The interfaces 108 may include a variety of machine readable instructions-based interfaces and hardware interfaces that allow interaction with a user and with other communication and computing devices, such as network entities, web servers, and external repositories, and peripheral devices. The memory 110 may include any non-transitory computer-readable medium including, for example, volatile memory (e.g., RAM), and/or non-volatile memory (e.g., EPROM, flash memory, Memristor, etc.). The memory 110 may also be an external memory unit, such as a flash drive, a compact disk drive, an external hard disk drive, or the like.

The modules 112 may be coupled to or be executable by the processor(s) 102, and may include, amongst other things, routines, programs, objects, components, data structures, and the like, which perform particular tasks or implement particular abstract data types. The system data 114 may serve as a repository for storing data that may be fetched, processed, received, or created by the modules 112 or received from connected computing systems and storage devices.

Further, the modules 112 can include the FS alignment module 104, a file system module 116, and other modules 118. The other modules 118 may include programs or coded instructions that supplement applications and functions, for example, programs in the operating system, of the computing system 100. Though shown as separate modules, it will be understood that in other implementations, the FS alignment module 104 may be implemented as a part of the file system module 116. In one implementation, the file system module 116 may itself be a part of an operating system of the system 100. It will be understood that the FS alignment module 104 and the file system module 116 can together form an adaptive file system as per the present subject matter.

Further, as illustrated, the storage device 106 may be a part of a storage array 120. The storage array can include multiple other storage devices, such as the second storage device 122 and so on. In one example, the second storage device 122 may be of the same type as the storage device 106 and may have the same chunk size. In another example, the second storage device 122 may be of a different type than the storage device 106 and may have a different chunk size. In one example, the storage array 120 may be a converged stack of a heterogeneous pool of storage devices having different chunking properties. The FS alignment module 104 can adaptively handle storage of data in the various storage devices in accordance with their respective chunk size as discussed herein.

In various implementations, the system 100 can be co-located with the storage array 120 or may communicate with the storage array 120 over a communication network (not shown in the figure). If used, the communication network may be a wireless network, a wired network, or a combination thereof. The communication network can also be an individual network or a collection of many such individual networks, interconnected with each other and functioning as a single large network, e.g., the Internet or an intranet, and can be implemented as any of the different types of networks, such as intranet, local area network (LAN), wide area network (WAN), and such. The communication network may also include individual networks, such as but not limited to, Global System for Communication (GSM) network, Universal Telecommunications System (UMTS) network, Long Term Evolution (LTE) network, etc. Further, the storage array 120 may include storage devices connected as, for example, storage area network (SAN) implemented over internet Small Computer System Interface (iSCSI) or fiber channel, direct attached storage, and the like.

In yet another example implementation, the system 100 may be implemented in a virtual machine environment and the FS alignment module 104 and the file system module 116 may, in such a case, be implemented by the virtual machine host operating system, such as a hypervisor. The virtual machine host operating system can communicate with storage array 120 and manage allocation of storage space and storage and retrieval of data for the virtual machines hosted thereon. It will be evident that various other example implementations may be derived based on the present disclosure and all such implementations are intended to be covered in the scope of the present disclosure though not expressly discussed herein.

In operation, as discussed, the FS alignment module 104 can receive a storage allocation request comprising a logical offset of data to be stored. Further, the FS alignment module 104 can receive a chunk size of the storage device 106 in which the data is to be stored and a device offset for a free region in the storage device. In one example, the FS alignment module 104 receives the storage allocation request and information with respect to the storage device 106 from the file system module 116. The file system module 116 keeps a track of the free and used regions of the storage devices, such as the storage devices 106 and 122 in the storage array 120, exposed to it. The file system module 116 also keeps a track of the files stored on the storage devices and allows applications to store, modify, and retrieve data from the storage array 120. In one implementation, the file system module 116 may store information about the files and storage device regions in the system data 114. In one implementation, the file system module 116 may use an agent (not shown in figs) on the storage array 120 to fetch the information for providing it to the FS alignment module 104.

For the storage allocation request, the FS alignment module 104 can determine a device start address such that the device start address is similarly aligned as the logical offset with respect to the alignment reference value. As discussed above, the device start address can be determined by offsetting the device offset with an offset value.

Further, the FS alignment module 104 can determine a device end address for the storage allocation request by summing the device start address with a size of the data. In one example, when the device end address exceeds an end address of the free region, the FS alignment module 104 can determine an aligned device end address that is lesser than or equal to the end address of the free region, and can set the device end address as the aligned device end address. Further, the data can be truncated at the aligned device end address and the remaining data can be stored in a new free region.

For the new free region, a new device start address and a new device end address can be computed in a manner similar to that discussed above. The new free region can be in the storage device 106 or the second storage device 122. Further, if the remaining data cannot be accommodated between the new device start address and the new device end address, it can be further truncated and stored in a next free region. The next free region may be on the storage device 106 or the second storage device 122 or yet another storage device in the storage array 120. Thus, the data can also be distributed across different storage devices while adapting the device start address each time to the respective storage device chunking properties.

The FS alignment module 104 can thus facilitate storage of data by computing the device start address and device end address for each free region based on the size of the data to be stored and providing the device start addresses and the device end addresses to the file system module 116 to store the data accordingly. These and other aspects are further explained in conjunction with various scenarios as exemplified in FIGS. 2(*a*)-(*d*).

FIGS. 2(*a*)-2(*d*) illustrate example scenarios S1-S4 for storing data, according to example techniques of the present disclosure. The example scenarios will be discussed with reference to the examples shown in Table 1 below. For these example scenarios, the file system block size is considered to be 8 KB while the device chunk size is considered to be 16 KB. Accordingly, the alignment reference value, when calculated as LCM of the block size and the chunk size can be determined to be 16 KB. Example scenario S5, though not shown in the figures, can be understood with reference to the description provided below.

TABLE 1

Example Scenarios

| Example Scenario No. | Allocation Request Size | File Logical Offset | Device Offset and Size of Free Region on the Device | End of Free Region | Offset value for Device Start Address | End Address after truncation if applicable |
| --- | --- | --- | --- | --- | --- | --- |
| S1 | 64 KB | 128 KB | 100 KB size at offset 480 KB | 580 KB | 0 KB | 544 KB |
| S2 | 64 KB | 128 KB | 100 KB size at offset 488 KB | 588 KB | 8 KB | 560 KB |
| S3 | 64 KB | 200 KB | 100 KB size at offset 256 KB | 356 KB | 8 KB | 328 KB |
| S4 | 64 KB | 600 KB | 100 KB size at offset 200 KB | 300 KB | 0 KB | 264 KB |
| S5 | 4096 KB | 256 KB | (1) 1024 KB size at offset 1000 KB | (1) 2024 KB | (1) 8 KB | (1) 2016 KB |
|  |  |  | (2) 1024 KB size at offset 3000 KB | (2) 4024 KB | (2) 8 KB | (2) 4016 KB |
|  |  |  | (3) 1024 KB size at offset 5000 KB | (3) 6024 KB | (3) 8 KB | (3) 6016 KB |
|  |  |  | (4) 1024 KB size at offset 7000 KB | (4) 8024 KB | (4) 8 KB | (4) 8016 KB |
|  |  |  | (5) 1024 KB size at offset 9000 KB | (5) 10024 KB | (5) 8 KB | (5) 9072 KB |

In the FIGS. 2(a)-2(d), B01, B1, . . . are used to represent file system block sizes while C0, C1, . . . are used to represent device chunk sizes. In the present examples, each chunk is of the size of two blocks and is hence represented accordingly. Further, LO represents the logical offset, DO represents the device offset, and DSA represents the device start address computed after shifting the DO by an offset value.

Consider scenario S1 represented in FIG. 2(a), where a storage allocation request requests for storing 64 KB data at a file logical offset of 128 KB. The device offset of a free region available may be 480 KB and size of free region may be 100 KB, as a result of which end of free region would be at 580 KB. In this case, both logical offset and the device offset are multiples of the alignment reference value. Hence the offset value computed would be 0 KB and the device start address would be the same as the device offset. Further since the sum of the device start address and data size (544 KB) is less than the end of the free region, the data would not be truncated and can be stored in the free region starting from the device start address. Hence, as shown in scenario S1, the LO starts at an even number block boundary of block B16 and is therefore aligned to the LCM. The DO also starts at a chunk boundary of chunk C30 and also aligned to the LCM. Hence the offset value is zero and the DSA is the same as the DO. The data is stored in an aligned manner starting from C30.

Consider scenario S2 represented in FIG. 2(b), where a storage allocation request requests for storing 64 KB data at a file logical offset of 128 KB. The device offset of a free region available may be 488 KB and size of free region may be 100 KB, as a result of which end of free region would be at 588 KB. In this case, while the logical offset is a multiple of the alignment reference value, the device offset is not. Hence the offset value computed would be 8 KB and the device start address would be 496 KB, i.e., the device offset shifted by 8 KB. Further since the sum of the device start address and data size (560 KB) less than the end of the free region, the data would not be truncated and can be stored in the free region starting from the device start address. Hence, as shown in scenario S2, the LO starts at an even number block boundary of block B16 and is aligned to the LCM while the DO starts within a chunk boundary of chunk C29 and is not aligned to the LCM. Hence the DSA is computed as the DO shifted by the offset value so as to align with the start of the next chunk C30.

Consider scenario S3 represented in FIG. 2(c), where a storage allocation request requests for storing 64 KB data at a file logical offset of 200 KB. The device offset of a free region available may be 256 KB and size of free region may be 100 KB, as a result of which end of free region would be at 356 KB. In this case, while the logical offset is not a multiple of the alignment reference value, the device offset is a multiple. Hence the offset value computed would be 8 KB and the device start address would be 264 KB, i.e., the device offset shifted by 8 KB. Further since the sum of the device start address and data size (328 KB) is less than the end of the free region, the data would not be truncated and can be stored in the free region starting from the device start address. Hence, as shown in scenario S3, the LO starts at an odd number block boundary of block B17 and is thus not aligned to the LCM. On the other hand, the DO starts at a chunk boundary of chunk C30 and is aligned to the LCM. Hence the DSA is the DO shifted by the offset value so as to start within the chunk C30 and not align with the LCM.

Consider scenario S4 represented in FIG. 2(d), where a storage allocation request requests for storing 64 KB data at a file logical offset of 600 KB. The device offset of a free region available may be 200 KB and size of free region may be 100 KB, as a result of which end of free region would be at 300 KB. In this case, both the logical offset and the device offset are not a multiple of the alignment reference value. Hence the offset value computed would be 0 KB and the device start address would be the same as the device offset. Further since the sum of the device start address and data size (264 KB) is less than the end of the free region, the data would not be truncated and can be stored in the free region. Hence, as shown in scenario S4, the LO starts at an odd number block boundary of block B17 and is thus not aligned to the LCM. The DO starts within chunk C30 and is also not aligned to the LCM. Hence the offset value is zero and the DSA is the same as the DO.

In yet another example, not shown in the figures, consider a scenario S5 where a storage allocation request requests for storing 4096 KB data at a file logical offset of 256 KB. The device offset of a first free region available may be 1000 KB and size of free region may be 1024 KB, as a result of which end of the first free region would be at 2024 KB. In this case, while the logical offset is a multiple of the alignment reference value, the device offset is not. Hence the offset value computed would be 8 KB and the device start address would be 1008 KB, i.e., the device offset shifted by 8 KB. Further since the sum of the device start address and data size (5104 KB) is more than the end of the first free region, the data would be truncated. For this, an aligned end address can be computed as the highest address less than or equal to the end of free region which is a multiple of the alignment reference value. In this case, the aligned end address would be 2016 KB. Thus, 1008 KB of data would be stored in the first free region starting from the device start address of 1008 KB and the remaining 3088 KB of data would be truncated.

The remaining 3088 KB of data would thus start at a file logical offset equal to the sum of logical offset of data in the first free region and the size of data stored in the first free region, which would be 1264 KB. Considering that the device offset of the second free region is at 3000 KB and size of the second free region available is 1024 KB, using the logic discussed above, the device start address and device end address for the second free region can be computed to be 3008 KB and 4016 KB respectively. Accordingly another 1008 KB of data would be stored in the second free region and the remaining 2080 KB of data would be truncated for storage in the next free region.

Similarly, considering a third free region of size 1024 KB at a device offset of 5000 KB, the device start address and device end address for the third free region can be computed to be 5008 KB and 6016 KB respectively. Accordingly another 1008 KB of data would be stored in the third free region and the remaining 1072 KB of data would be truncated for storage in the next free region.

Further, considering a fourth free region of size 1024 KB at a device offset of 7000 KB, the device start address and device end address for the fourth free region can be computed to be 7008 KB and 8016 KB respectively. Accordingly another 1008 KB of data would be stored in the third free region and the remaining 64 KB of data would be truncated for storage in the next free region.

In the fifth free region, considering a size of 1024 KB is available at a device offset of 9000 KB, the device start address and device end address for the fifth free region can be computed to be 9008 KB and 9072 KB respectively to store the remaining 64 KB of data.

Thus, alignment of the device start address can be performed based on the logical offset of the data to be stored. If the logical offset is aligned, the device start address of the free region may be intentionally aligned when not already aligned. On the other hand, if the logical offset is unaligned, the device start address of the free region may be intentionally unaligned by a similar size when not already unaligned. Further, when the size of data exceeds the free region available, the end address may also be intentionally aligned. Thus, capacity optimization techniques, such as deduplication and thin reclamation, can work more efficiently since similar data and free regions would be similarly aligned in the chunks.

Further, the skipped free region, created due to the shifting of the device offset or alignment of the device end address, can be used for storing small files or metadata, thus reducing the effective disk fragmentation.

Figure 3:
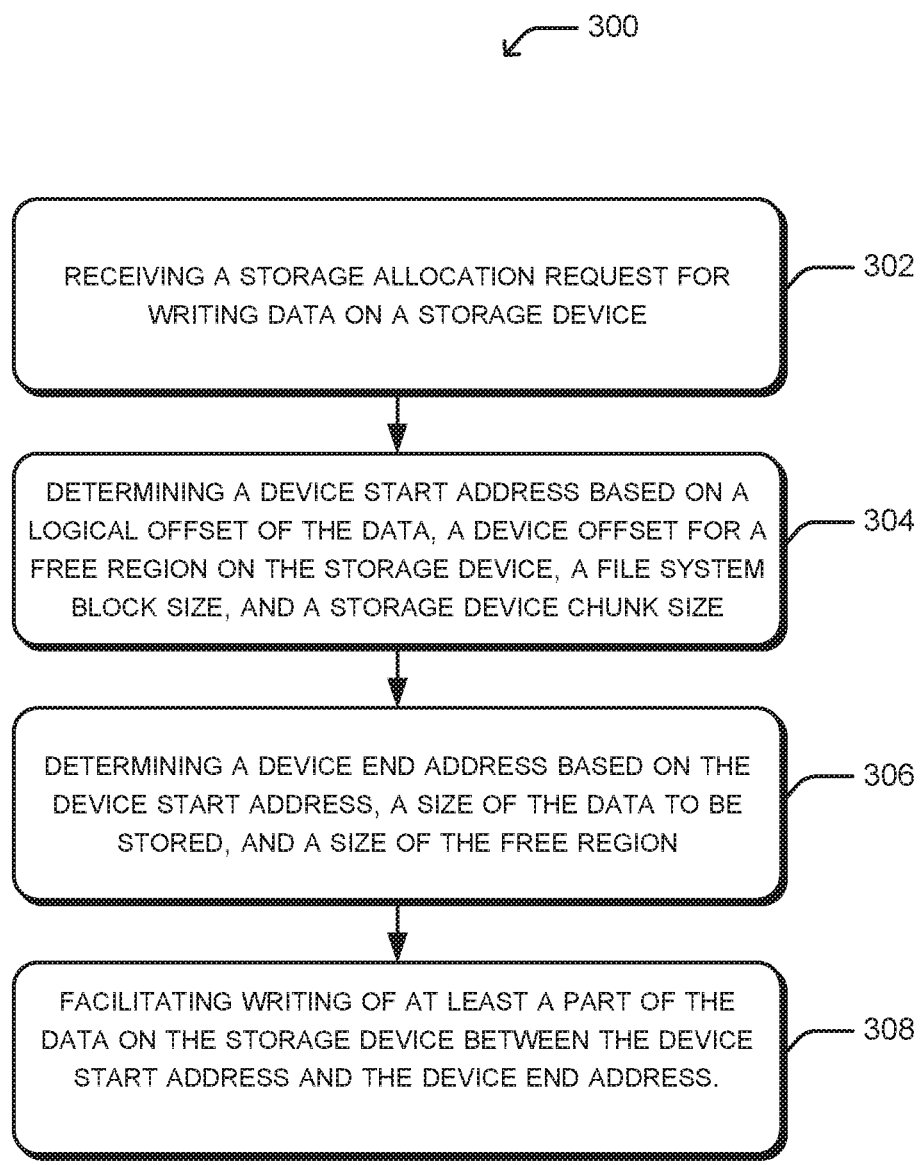
FIGS. 3 and 4 illustrate example method implementations for storing data, according to example techniques of the present disclosure.
Figure 4:
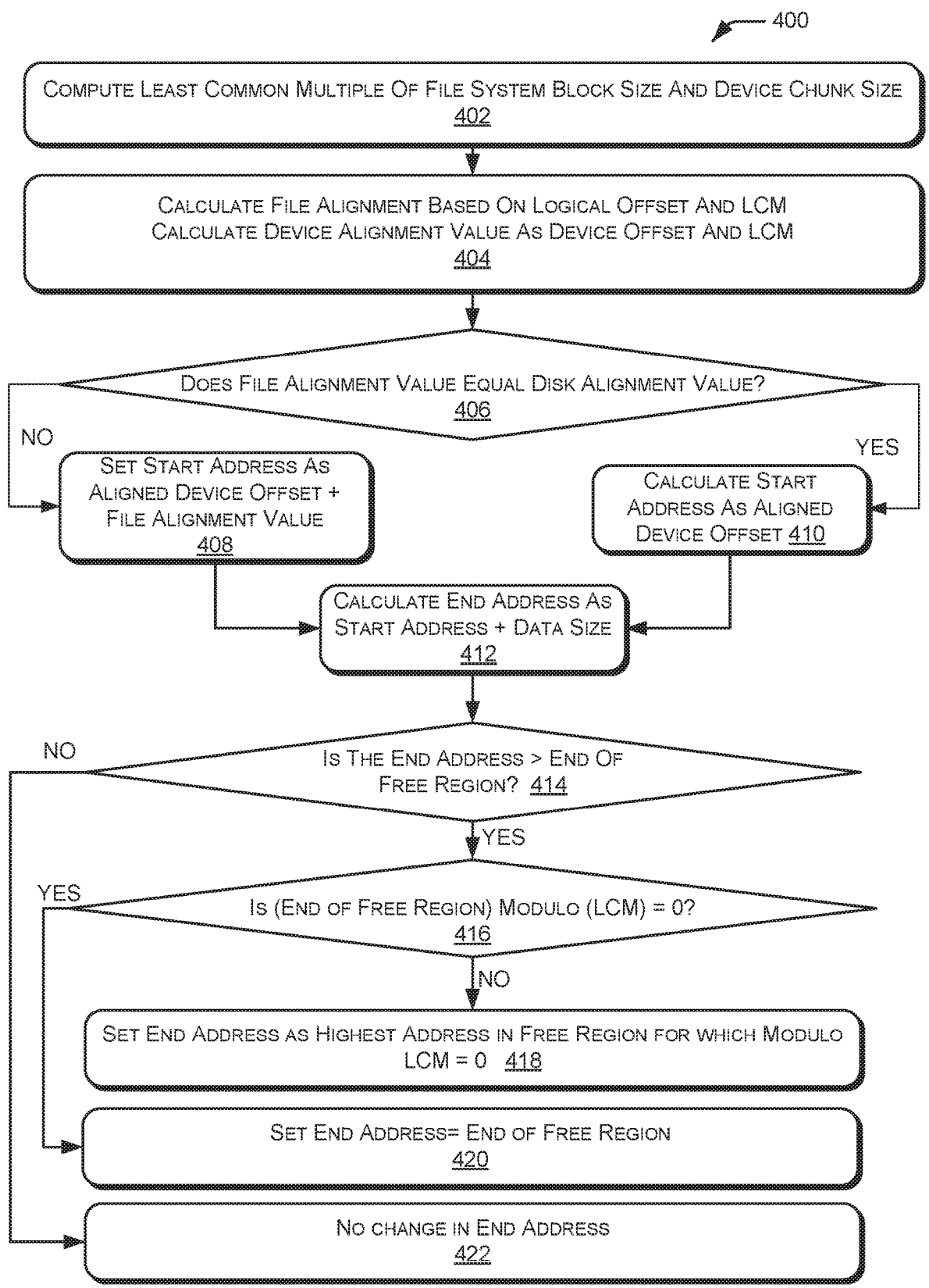

FIGS. 3 and 4 illustrate example method implementations 300 and 400 respectively, for storing data, according to example techniques of the present disclosure.

The order in which the methods 300 and 400 are described is not intended to be construed as a limitation, and any number of the described method blocks may be combined in any order to implement the methods 300 and 400, or an alternative method. Furthermore, the methods 300 and 400 may be implemented by processor(s) or computing device(s) through any suitable hardware, non-transitory machine readable instructions, or combination thereof.

It may be understood that steps of the method 300 and 400 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 300 and 400 may be implemented in a variety of systems; the methods 300 and 400 are explained in relation to the aforementioned system 100, for ease of explanation.

Referring to method 300, at block 302, a storage allocation request for writing data on a storage device is received. The storage allocation request can include a logical offset of the data and a size of the data. In one example, the request may be received by the FS alignment module 104.

At block 304, a device start address is determined based on the logical offset of the data, a device offset for a free region on the storage device, a file system block size, and a chunk size of the storage device. In one example, the device start address is determined by offsetting the device offset by an offset value that is a modulo operation of the device offset and an alignment reference value. The alignment reference value is in turn a function of the file system block size and the storage device chunk size. In one example, the file system alignment module 104 may determine the device start address.

At block 306, a device end address is determined based on the device start address, a size of the data to be stored, and a size of the free region. In one example, if the sum of the device start address and the size of the data to be stored lies within the free region, then the device end address is set to the sum. In another example, if the sum exceeds the free region, then the device end address may be set to an address within the free region and the data may be truncated at the device end address. The truncated data may be then stored in a new free region. In one example, the file system alignment module 104 may determine the device end address.

At block 308, at least a part of the data is stored on the storage device between the device start address and the device end address. Further, a mapping between the logical offset of the start of the data and the device start address and the size of the data stored between the device start address and the device end address may be stored in a mapping table for subsequent retrieval of the data. In one example, the file system alignment module 104 may provide the device start address and the device end address to the file system module 116 for storage of the data.

Referring to FIG. 4, which illustrates another method 400 for determining the device start address and device end address for storing data in accordance with techniques of the present disclosure, at block 402, the least common multiple (LCM) of the file system block size and the device chunk size determined as the alignment reference value. While in this implementation discussed in method 400, the LCM is used as a reference value, in other implementations, other functions of the file system block size and the device chunk size may be used as the reference value for alignment.

At block 404, a file alignment value is determined based on the logical offset and the LCM. Similarly, a device alignment value is determined based on the device offset and the LCM. In one example, the file alignment value is computed as the modulo operation of the logical offset and the LCM. Similarly, the device alignment value is computed as the modulo operation of the device offset and the LCM. It will be understood that modulo is a function that provides the remainder when a first value is divided by a second value. The second value is the LCM in the example method 400.

At block 406, it is determined if the file alignment value and the device alignment value are equal. If the two are equal, it indicates that the alignment states of the logical offset and the device offset are the same, i.e., either both the device offset and the logical offset are aligned or are misaligned by the same number of bytes.

If at block 406 the two alignment values are found to be not equal, the method 400 proceeds to block 408, following the "no" branch, where the device start address is computed as a sum of an aligned device offset and file alignment value. The aligned device offset is the largest address less than or equal to the device offset which is a multiple of the LCM. As a result, the device start address gets similarly aligned as the logical offset.

If at block 406 the two alignment values are found to be equal, the method 400 proceeds to block 410, following the "yes" branch, where the device start address is set as the device offset, i.e., no further offset is done.

Once a device start address is computed, at either block 408 or block 410, the method 400 proceeds to block 412 where an end address is calculated as a sum of start address and the size of the data to be stored.

At block 414, it is determined whether the end address is greater than the end of the free region. If no, then the method 400 proceeds to block 422 where no change is done in the end address.

If yes, then the method 400 proceeds to block 416 it is determined whether the end of free region is a multiple of the LCM. If yes, then the method 400 proceeds to block 420 where the end address is reset to the end of the free region. If no, then the method 400 proceeds to block 418 where the end address is set to the highest address in the free region for which modulo LCM is zero, i.e., which is a multiple of the LCM.

Accordingly, once the end address has been set, at least a part of the data can be stored between the start address and the end address. Further, when the size of the data exceeds the region between the start address and the end address, the data can be truncated at the end address. The truncated data can be then stored in a new free region and a new device start address and a new device end address can be computed using method 400 for the new free region. Further, when a size of the truncated data exceeds a size of the new free region available from the new device start address, it may be further truncated and distributed in one or more storage devices.

Thus, the present disclosure allows for adaptive data storage across distributed storage devices, for example, in a storage array or a converged stack, while also allowing for efficient capacity optimization.

Figure 5:
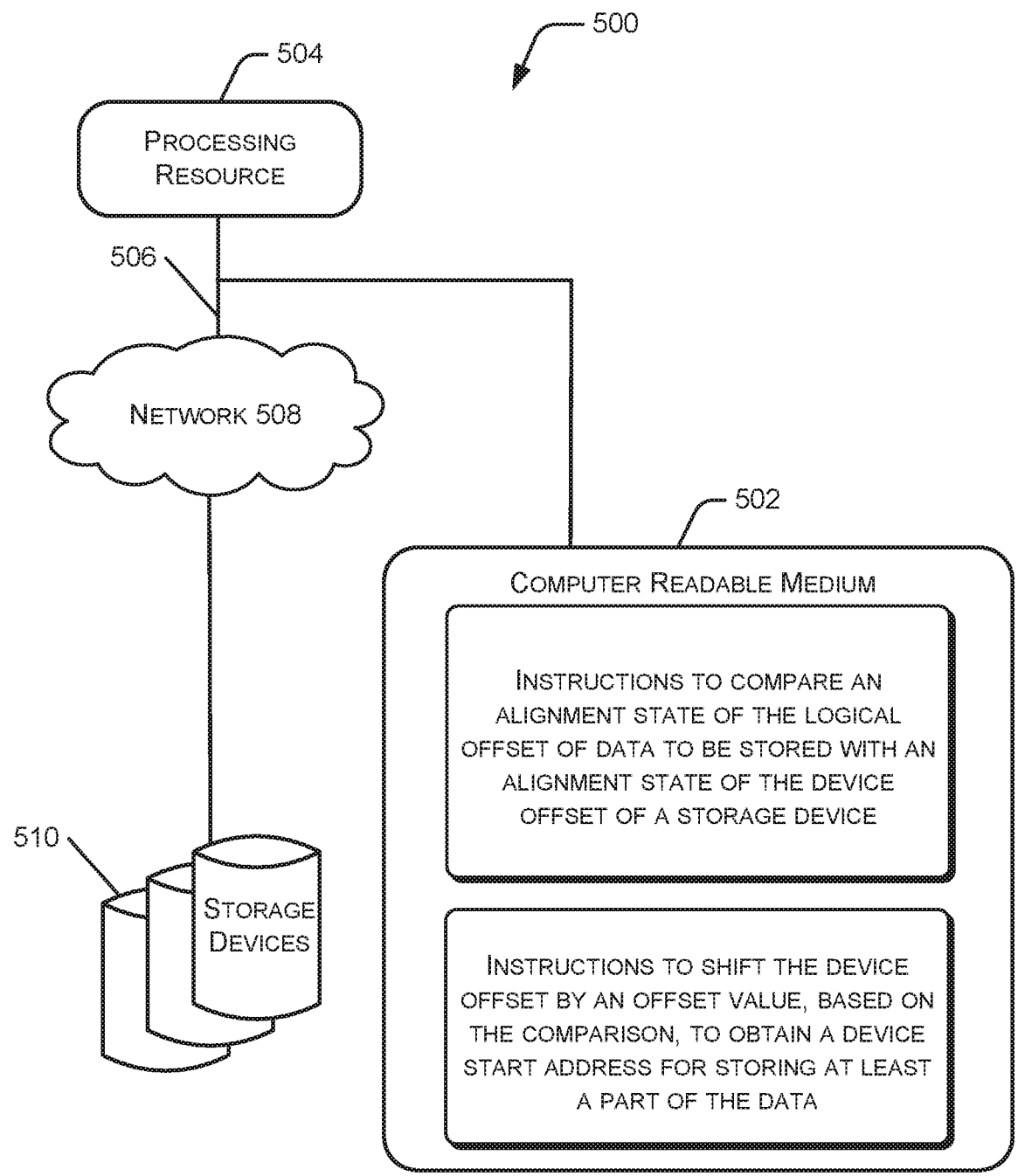
FIG. 5 illustrates an example computing environment, implementing a non-transitory computer-readable medium, for storing data, according to example techniques of the present disclosure.

FIG. 5 illustrates an example computing environment 500, implementing a non-transitory computer-readable medium for storing data in a storage device, according to an example of the present subject matter.

In one implementation, the non-transitory computer readable medium 502 may be utilized by a computing system, such as the system 100. The system 100 may be implemented in a public networking environment or a private networking environment. In one implementation, the computing environment 500 may include a processing resource 504 communicatively coupled to the non-transitory computer readable medium 502 through a communication link 506.

For example, the processing resource 504 may be implemented in a computing system, such as the system 100 described earlier. The computer readable medium 502 may be, for example, an internal memory device or an external memory device. In one implementation, the communication link 506 may be a direct communication link, such as any memory read/write interface.

In another implementation, the communication link 506 may be an indirect communication link, such as a network interface. In such a case, the processing resource 504 may access the computer readable medium 502 through a network 508. The network 508 may be a single network or a combination of multiple networks and may use a variety of different communication protocols.

Further, the processing resource 504 and the computer readable medium 502 may also communicate with various storage devices 510, such as storage devices in a storage array. The storage devices 510 may be connected by any of different ways, such as storage area network (SAN) implemented over Internet Small Computer System Interface (iSCSI) or fiber channel, direct attached storage, and the like.

In one implementation, the computer readable medium 502 includes a set of computer readable instructions, such as instructions corresponding to the FS alignment module 104 and the file system module 116. The set of computer readable instructions may be accessed by the processing resource 504 through the communication link 506 and subsequently executed for storing data in the storage devices 510.

For example, the instructions may be executable to cause the processing resource 504 to receive a storage allocation request comprising a logical offset of data to be stored, and receive a chunk size of a storage device in which the data is to be stored and a device offset for a free region in the storage device. Further, the instructions may cause the processing resource 504 to compare an alignment state of the logical offset with an alignment state of the device offset. The alignment states may be determined based on the chunk size and a file system block size. As discussed earlier, the chunk size and file system block size may be used to determine an alignment reference value, for example, as the least common multiple of the two sizes. The alignment state of the logical offset indicates whether the logical offset is aligned to the alignment reference value.

In one example, if the logical offset is a multiple of the alignment reference value, then alignment state of the logical offset is "True" indicating that the logical offset is aligned to the alignment reference value. Else, the alignment state of the logical offset is "False". Similarly, in one example, if the device offset is a multiple of the alignment reference value, then alignment state of the device offset is "True" indicating that the device offset is aligned to the alignment reference value, Else, the alignment state of the device offset is "False".

Further, an offset value may be computed and the device offset may be shifted by the offset value, based on the comparison, to obtain a device start address for the storage allocation request. In one example, if alignment states of both the logical offset and the device offset are the same, then the offset value may be zero. Else, the offset value may be a function of the remainder when the device offset is divided by the alignment reference value. The instructions may then cause the processing resource 504 to facilitate storing at least a part of the data in the free region of the storage device starting from the device start address.

In one example, if the size of the data exceeds the free region available starting from the device start address, the data may be truncated and the remaining data may be stored in a new free region having a new device offset. In one example, the data may be truncated such that the end address at which the data is truncated is aligned to the alignment reference value. Further, for the truncated data, a new device start address for may be computed for storing it in a new free region in a manner similar to that discussed above.

In one example, the new free region may be in the same storage device in which the previous part of the data was stored. In another example, the new free region may be in the storage space of a second storage device.

Accordingly, as discussed above, the instructions can cause the processing resource 504 to obtain the new start address based on a comparison of the alignment states of a logical offset of the truncated data and a device offset for the new free region, where the alignment states are determined based on a chunk size of the second storage device and the file system block size.

In one example, if the size of the truncated data also exceeds the size of the new free region available starting from the new start address, then it may be further truncated and stored in a next free region. Thus, the data to be stored may be truncated multiple times and distributed and stored across multiple free regions in various storage devices while ensuring that each time the truncated data is aligned with respect to its logical offset and the device start address from where it is stored. Also, as discussed above, the data can be aligned with respect to its end address at which it is truncated.

Thus, data that is stored can be aligned at a granular level across different storage devices with minimal processing overheads and can increase the effectiveness of capacity optimization techniques implemented by the storage devices.

Although implementations of systems and methods for storing data on a storage device have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processing resource; and
a computer readable medium comprising computer readable instructions executable by the processing resource to:
receive a storage allocation request comprising a logical offset of data to be stored;
receive a chunk size of a storage device and a device offset for a free region on the storage device;
compute an offset value based on a file system block size, the chunk size, the device offset, and the logical offset, including determination of an alignment reference value based on the chunk size and the file system block size;
determine a device start address, for storing the data in response to the storage allocation request, by offsetting the device offset with the offset value;
align the device start address to the alignment reference value when the logical offset is aligned to the alignment reference value; and
misalign the device start address to the alignment reference value when the logical offset is misaligned to the alignment reference value.

2. The system of claim 1, wherein the instructions are executable by the processing resource to further determine a device end address for the storage allocation request by summing the device start address with a size of the data.

3. The system of claim 2, wherein the instructions are executable by the processing resource to, on determining device end address to be greater than an end address of the free region:
determine an aligned device end address that is lesser than the end address of the free region;
set the device end address as the aligned device end address; and
determine a new device start address and a new device end address in a new free region for storing remaining data.

4. A method comprising:
receiving a storage allocation request for writing data on a storage device;
determining a device start address based on a logical offset of the data, a device offset for a free region on the storage device, a file system block size, and a storage device chunk size, including:
computing a least common multiple of the file system block size and the storage device chunk size;
calculating a file alignment value based on the least common multiple and the logical offset; and
calculating a device alignment value based on the least common multiple and the device offset;
determining a device end address based on the device start address, a size of the data to be stored, and a size of the free region; and
storing at least a part of the data on the storage device between the device start address and the device end address.

5. The method of claim 4, wherein, when the file alignment value and the device alignment value are unequal, the method further comprises:
computing an aligned device offset based on the device offset, wherein the aligned device offset is a multiple of the least common multiple; and
setting the device start address as a sum of the aligned device offset and the file alignment value.

6. The method of claim 4, wherein, when the file alignment value and the device alignment value are equal, the method further comprises setting the device start address as the device offset.

7. The method of claim 4, wherein determining the device end address comprises:

computing a sum of the device start address and the size of the data; and setting the device end address as the sum when the sum is within the free region.

8. The method of claim 7, wherein, when the sum exceeds the free region, the method comprises:

setting the device end address as the highest multiple of the storage device chunk size in the free region;

truncating the data by a size equal to the difference between the sum and the device end address; and storing truncated data in a new free region based on determination of a new device start address and a new device end address corresponding to the new free region.

9. A non-transitory computer-readable medium comprising instructions for storing data in a storage device, the instructions being executable by a processing resource to:

receive a storage allocation request comprising a logical offset of data to be stored;

receive a chunk size of a storage device in which the data is to be stored and a device offset for a free region in the storage device;

compute an offset value based on a file system block size, the chunk size, the device offset, and the logical offset, including determination of an alignment reference value based on the chunk size and the file system block size;

determine a device start address, for storing the data in response to the storage allocation request, by offsetting the device offset with the offset value;

align the device start address to the alignment reference value when the logical offset is aligned to the alignment reference value;

misalign the device start address to the alignment reference value when the logical offset is misaligned to the alignment reference value; and facilitate storing at least a part of the data in the free region starting from the device start address.

10. The non-transitory computer-readable medium of claim 9, wherein, the instructions are further executable by the processing resource to:

truncate data when a size of the data exceeds the free region available starting from the device start address;

obtain a new device start address for storing truncated data in a new free region; and facilitate storing at least a part of the truncated data in the new free region starting from the new device start address.

11. The non-transitory computer-readable medium of claim 10, wherein, for the new free region being of a second storage device, the instructions are further executable by the processing resource to:

obtain the new start address based on a comparison of the alignment states of a logical offset of the truncated data and a device offset for the new free region, wherein the alignment states are determined based on a chunk size of the second storage device and the file system block size.

12. The non-transitory computer-readable medium of claim 10, wherein the instructions are further executable by the processing resource to: further truncate and distribute storage of the truncated data when a size of the truncated data exceeds a size of the new free region available from the new device start address.

* * * * *